(12) United States Patent
Shimada et al.

(10) Patent No.: US 12,291,087 B2
(45) Date of Patent: May 6, 2025

(54) SEALING STRUCTURE FOR DOOR OF AUTOMOBILE

(71) Applicant: NISHIKAWA RUBBER CO., LTD., Hiroshima (JP)

(72) Inventors: Hiroshi Shimada, Hiroshima (JP); Toshifumi Matsuura, Hiroshima (JP)

(73) Assignee: NISHIKAWA RUBBER CO., LTD., Hiroshima-ken (JP)

( * ) Notice: Subject to any disclaimer, the term of this patent is extended or adjusted under 35 U.S.C. 154(b) by 0 days.

(21) Appl. No.: 18/642,844

(22) Filed: Apr. 23, 2024

(65) Prior Publication Data

US 2024/0367495 A1 Nov. 7, 2024

(30) Foreign Application Priority Data

May 1, 2023 (JP) .................................. 2023-075721

(51) Int. Cl.
| | |
|---|---|
| *B60J 10/25* | (2016.01) |
| *B60J 5/04* | (2006.01) |
| *B60J 10/26* | (2016.01) |
| *B60J 10/84* | (2016.01) |
| *B60J 10/86* | (2016.01) |

(52) U.S. Cl.
CPC ............ *B60J 10/86* (2016.02); *B60J 5/0479* (2013.01); *B60J 10/25* (2016.02); *B60J 10/26* (2016.02); *B60J 10/84* (2016.02)

(58) Field of Classification Search
CPC ........... B60J 10/25; B60J 10/21; B60J 5/0479
See application file for complete search history.

(56) References Cited

U.S. PATENT DOCUMENTS

| | | | |
|---|---|---|---|
| 4,492,405 A | 1/1985 | Chikaraishi et al. | |
| 6,607,505 B1* | 8/2003 | Thompson ........ | A61M 25/0147 606/41 |
| 7,073,294 B2* | 7/2006 | Yamaoka ................. | B60J 10/80 49/475.1 |
| 10,081,232 B2* | 9/2018 | Ogawa ...................... | B60J 10/87 |
| 11,220,166 B2* | 1/2022 | Ogawa ...................... | B60J 10/84 |
| 11,780,307 B2* | 10/2023 | Shimada .................. | B60J 10/86 49/476.1 |

(Continued)

FOREIGN PATENT DOCUMENTS

| | | |
|---|---|---|
| JP | S58188319 A | 11/1983 |
| JP | S5914519 A | 1/1984 |

(Continued)

*Primary Examiner* — Daniel J Troy
*Assistant Examiner* — Susan M. Heschel
(74) *Attorney, Agent, or Firm* — Holtz, Holtz & Volek PC (57) ABSTRACT

A first molded part with a first concave-shaped part is provided on a front door, and a second molded part with a second concave-shaped part is provided on a rear door. The first and second molded parts make elastic contact with a main seal provided on an automobile body of a center pillarless automobile, to seal a gap between the doors. A rear surface of a first rear wall of the first concave-shaped part and a front surface of a second front wall of the second concave-shaped part of a sealing structure for a door of an automobile each have an upper part and an outer-cabin side part inclined toward a front part of the automobile body. The front surface makes elastic contact with the rear surface when the doors are in closed positions.

10 Claims, 11 Drawing Sheets

(56) References Cited

U.S. PATENT DOCUMENTS

| | | | | |
|---|---|---|---|---|
| 11,987,104 B2* | 5/2024 | Shimada | ............... | B60J 10/86 |
| 2016/0368356 A1* | 12/2016 | Amagai | ............... | B60J 10/86 |
| 2021/0300166 A1* | 9/2021 | Kajita | ............... | B60J 10/24 |

FOREIGN PATENT DOCUMENTS

| | | | |
|---|---|---|---|
| JP | H079628 | U | 2/1995 |
| JP | 2006248422 | A | 9/2006 |
| JP | 2006248426 | A | 9/2006 |
| JP | 2009078665 | A | 4/2009 |
| JP | 2009269526 | A | 11/2009 |
| JP | 2019189048 | A | 10/2019 |

* cited by examiner

PRIOR ART

Fig. 11
PRIOR ART

SEALING STRUCTURE FOR DOOR OF AUTOMOBILE

REFERENCE TO RELATED APPLICATIONS

This application claims the benefit under 35 USC § 119 of JP Patent Application JP 2023-075721 filed May 1, 2023, the entire disclosure of which is incorporated herein by reference.

BACKGROUND OF THE INVENTION

The present invention relates to a sealing structure for a door of an automobile, and more specifically to a sealing structure between a front door and a rear door of a center pillarless automobile.

Figure 10:
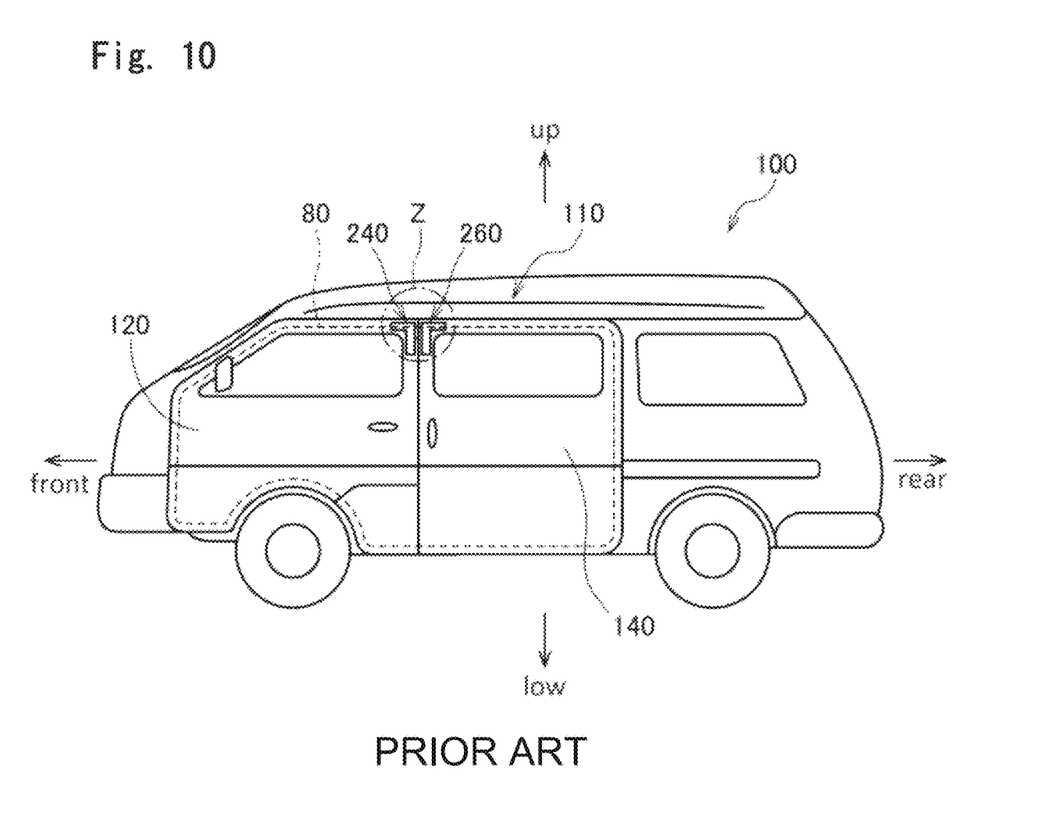
FIG. 10 is an external side view of a left side part of the center pillarless automobile.

A center pillarless automobile 100 illustrated in FIG. 10, which includes a front door 120 and a rear door 140 and is without a center pillar, has been used commonly. The front door 120 is moved in a right and left direction through hinges provided at a front part of the front door 120, and has a first molded part 240 provided on an upper part of a rear end. The rear door 140 is moved between at least two positions to open and close a door opening of an automobile body of the automobile, and has a second molded part 260 provided on an upper part of a front end. A main seal 80 is provided along a door opening edge 110 of the automobile body.

When the doors 120, 140 are in closed positions, the doors 120, 140 make elastic contact with the main seal 80 with the molded parts 240, 260 making elastic contact with each other on an upper part Z of a parting portion between the doors 120, 140, to seal a gap between the doors 120, 140. The molded parts 240, 260 also make elastic contact with the main seal 80, to seal a gap between the doors 120, 140 and the door opening edge 110 (see, for example, FIG. 2 of Japanese Unexamined Patent Application Publication No. 59-14519).

Figure 11:
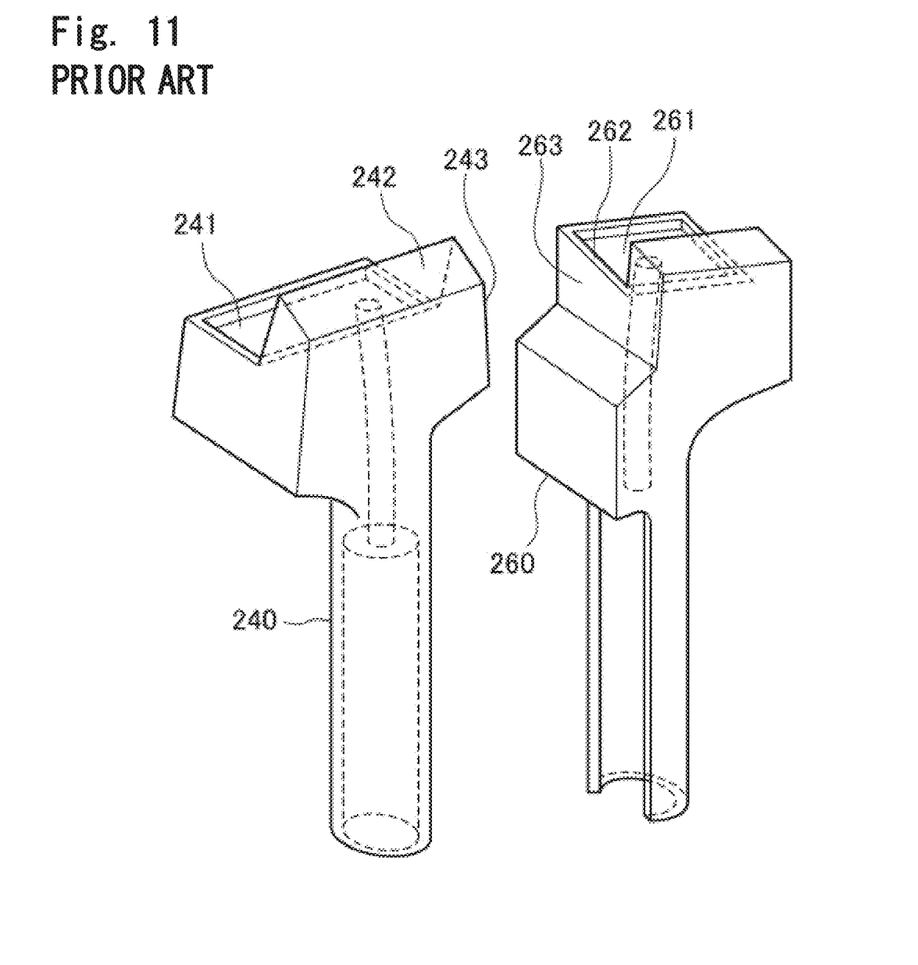
FIG. 11 is an enlarged perspective view of the principal components of a conventional sealing structure for a door of an automobile.

As illustrated in FIG. 11, the first molded part 240 includes a first concave-shaped part 241 and the second molded part 260 includes a second concave-shaped part 261. The first concave-shaped part 241 includes a first rear wall 242 and the second concave-shaped part 261 includes a second front wall 262. When the doors 120, 140 are in the closed positions, a rear surface 243 of the first rear wall 242 is fit on a front surface 263 of the second front wall 262, to make elastic contact with each other (see, for example, FIGS. 5 and 2 of Japanese Unexamined Patent Application Publication No. 59-14519).

The rear surface 243 and the front surface 263, which are fit with each other and form sealing surfaces, are made of soft rubber material and formed by die-molding. Unfortunately, however, the soft rubber material in contact with another soft rubber material is inferior to the soft rubber material in contact with a metallic door panel in sealing performance. In addition, the fitting surfaces are straightly pressed against a front and rear direction of the automobile body, that is the sealing surfaces are parallel to the right and left direction of the automobile body. This configuration allows water to get in the automobile body from a space between the rear surface 243 and the front surface 263 under a deviation in fitting in the front and rear direction that separates the front surface 263 from the rear surface 243 when the doors 120, 140 are in the closed positions.

Also, this configuration can bend and deform the concave-shaped parts 241, 261 allowing water to get in the automobile body from the deformed parts under another deviation in fitting that brings the rear surface 243 and the front surface 263 close to each other when the doors 120, 140 are in the closed positions.

Too much amount of water can get over the concave-shaped parts 241, 261, provided on the upper part of the molded parts 240, 260, and get in the automobile body.

To solve the above problems, it is an object of the present invention to provide a sealing structure that performs an improved sealing performance under a slight deviation in fitting for a door of an automobile.

SUMMARY OF THE INVENTION

To achieve the above object, an aspect of the present invention provides a sealing structure for a door of an automobile. The structure includes a main seal (80), a first molded part (40), and a second molded part (60).

The main seal (80) is provided along a door opening edge (110) of an automobile body of a center pillarless automobile (100).

The first molded part (40) is provided on an upper part of a rear end of a front door (120). The first molded part (40) includes a first concave-shaped part (43) on an upper part.

The first concave-shaped part (43) has an upper side opening. The first concave-shaped part (43) includes a first rear wall (46).

A rear surface (46a) of the first rear wall (46) of the first concave-shaped part (43) has an upper part inclined to be closer to a front part of the automobile body than a lower part as well as an outer-cabin side part inclined to be closer to the front part of the automobile body than an inner-cabin side part.

The second molded part (60) is provided on an upper part of a front end of a rear door (140). The second molded part (60) includes a second concave-shaped part (63) on an upper part. The first molded part (40) and the second molded part (60) make elastic contact with the main seal (80), to seal a parting portion between the front door (120) and the rear door (140).

The second concave-shaped part (63) has an upper side opening. The second concave-shaped part (63) includes a second front wall (66).

A front surface (66a) of the second front wall (66) of the second concave-shaped part (63) has an upper part inclined to be closer to the front part of the automobile body than a lower part as well as an outer-cabin side part inclined to be closer to the front part of the automobile body than an inner-cabin side part. The front surface (66a) makes elastic contact with the rear surface (46a) of the first rear wall (46) of the first concave-shaped part (43) when the front door (120) and the rear door (140) are in closed positions.

In addition, according to an aspect of the present invention, the front surface (66a) of the second front wall (66) of the second concave-shaped part (63) makes elastic contact with the rear surface (46a) of the first rear wall (46) of the first concave-shaped part (43) above the main seal (80). The rear surface (46a) has an upper edge lower than an upper edge of the front surface (66a).

In addition, according to an aspect of the present invention, the structure further includes an upper parting seal (95) provided on an upper side part of the door opening edge (110) of the of the automobile body above the main seal (80). The upper parting seal (95) makes elastic contact with the front door (120) and the rear door (140) when the doors (120, 140) are in the closed positions with the front surface (66a) of the second front wall (66) of the second concave-shaped part (63) making elastic contact with the rear surface (46a) of the first rear wall (46) of the first concave-shaped part (43) below the upper parting seal (95).

In addition, according to an aspect of the present invention, the structure further includes a first cut (49) provided on a first outer-cabin wall (45) of the first concave-shaped part (43). The first cut (49) is used to guide water inside the first concave-shaped part (43) toward the exterior of the automobile. The structure further includes a second cut (69) provided on a second outer-cabin wall (65) of the second concave-shaped part (63). The second cut (69) is used to guide water inside the second concave-shaped part (63) toward the exterior of the automobile.

In addition, according to an aspect of the present invention, the structure further includes a first bead (52) provided on a first outer-cabin side surface (42) of the first molded part (40) below the first cut (49). The first bead (52) is inclined downward toward a rear part of the automobile body.

In addition, according to an aspect of the present invention, the structure further includes a second bead (71) provided on a second outer-cabin side surface (62) of the second molded part (60) below the second cut (69). The second bead (71) is inclined downward toward the front part of the automobile body.

Symbols in parentheses show constituents or items corresponding to the drawings.

According to the present invention, the first molded part, which includes the first concave-shaped part on the upper part, is provided on the upper part of the rear end of the front door of the center pillarless automobile. The second molded part, which includes the second concave-shaped part on the upper part, is provided on the upper part of the front end of the rear door. The front surface of the second front wall of the second concave-shaped part makes elastic contact with the rear surface of the first rear wall of the first concave-shaped part when the doors are in the closed positions. The rear surface of the first rear wall of the first concave-shaped part has the upper part inclined to be closer to the front part of the automobile body than the lower part as well as the outer-cabin side part inclined to be closer to the front part of the automobile body than the inner-cabin side part. The front surface of the second front wall of the second concave-shaped part has the upper part inclined to be closer to the front part of the automobile body than the lower part as well as the outer-cabin side part inclined to be closer to the front part of the automobile body than the inner-cabin side part. This configuration improves sealing performance between two adjacent die-molded parts, that is between the first and second molded parts.

Straightly pressing the rear surface of the first rear wall of the first concave-shaped part and the front surface of the second front wall of the second concave-shaped part against a front and rear direction of the automobile body as disclosed in Japanese Unexamined Patent Application Publication No. 59-14519 allows water to get in the automobile body from a space between the rear surface and the front surface under a deviation in fitting in the front and rear direction that separates the front surface from the rear surface. In other words, sealing surfaces that are parallel to the right and left direction of the automobile body yield the space when the vertical planes make elastic contact with each other. The rear surface and the front surface of the present invention are inclined in an upper and lower direction and in a right and left direction of the automobile body and make elastic contact with each other. This configuration hardly yields the space between the rear surface and the front surface under the deviation that separates the front surface from the rear surface. In addition, one of the first concave-shaped part and the second concave-shaped part that comes on a lower side position than the other receives water if the space is yielded, to keep sealing performance unspoiled. Also, this configuration hardly deforms the first and second concave-shaped parts under another deviation that brings the rear surface and the front surface close to each other, to keep the sealing performance unspoiled.

In addition, according to an aspect of the present invention, the front surface of the second front wall of the second concave-shaped part makes elastic contact with the rear surface of the first rear wall of the first concave-shaped part above the main seal, to prevent drop of water toward the main seal. This configuration eliminates the need for increasing sealing function by increasing surface pressure of the main seal or inserting a pad in a hollow part of the main seal.

In addition, according to an aspect of the present invention, the structure further includes the upper parting seal provided on the upper side part of the door opening edge of the automobile body above the main seal. The upper parting seal makes elastic contact with the front door and the rear door when the doors are in the closed positions with the front surface of the second front wall of the second concave-shaped part making elastic contact with the rear surface of the first rear wall of the first concave-shaped part below the upper parting seal. This configuration enables the first and second concave-shaped parts to receive water that drops from the upper parting seal, to improve the sealing performance.

In addition, according to an aspect of the present invention, the structure further includes the first cut provided on the first outer-cabin wall of the first concave-shaped part. The first cut is used to guide water inside the first concave-shaped part toward the exterior of the automobile. The structure further includes the second cut provided on the second outer-cabin wall of the second concave-shaped part. The second cut is used to guide water inside the second concave-shaped part toward the exterior of the automobile. This configuration prevents overflow of water received by the first and second concave-shaped parts.

In addition, according to an aspect of the present invention, the structure further includes the first bead provided on the first outer-cabin side surface of the first molded part below the first cut. The first bead is inclined downward toward the rear part of the automobile body. The first bead is used to guide water that drops from the first cut toward the exterior of the automobile. This configuration prevents defects in drainage such as splash of water.

In addition, according to an aspect of the present invention, the structure further includes the second bead provided on the second outer-cabin side surface of the second molded part below the second cut. The second bead is inclined downward toward the front part of the automobile body. The second bead is used to guide water that drops from the second cut toward the exterior of the automobile. This configuration prevents defects in the drainage such as splash of water.

DETAILED DESCRIPTION

Referring to the Drawings, a sealing structure according to an embodiment of the present invention for a door of an automobile will be described.

The sealing structure is applied to an upper part of a parting portion illustrated in FIG. 11, which is part Z of FIG. 10, between a front door 120 and a rear door 140 of a center pillarless automobile 100 illustrated in FIG. 10. The front door 120 is moved in a right and left direction through hinges provided at a front part of the front door 120, and has a first molded part 40 provided on an upper part of a rear end. The rear door 140 is moved between at least two positions to open and close a door opening of an automobile body of the automobile, and has a second molded part 60 provided on an upper part of a front end. A main seal 80 is provided along a door opening edge 110 of the automobile body.

Figure 1:
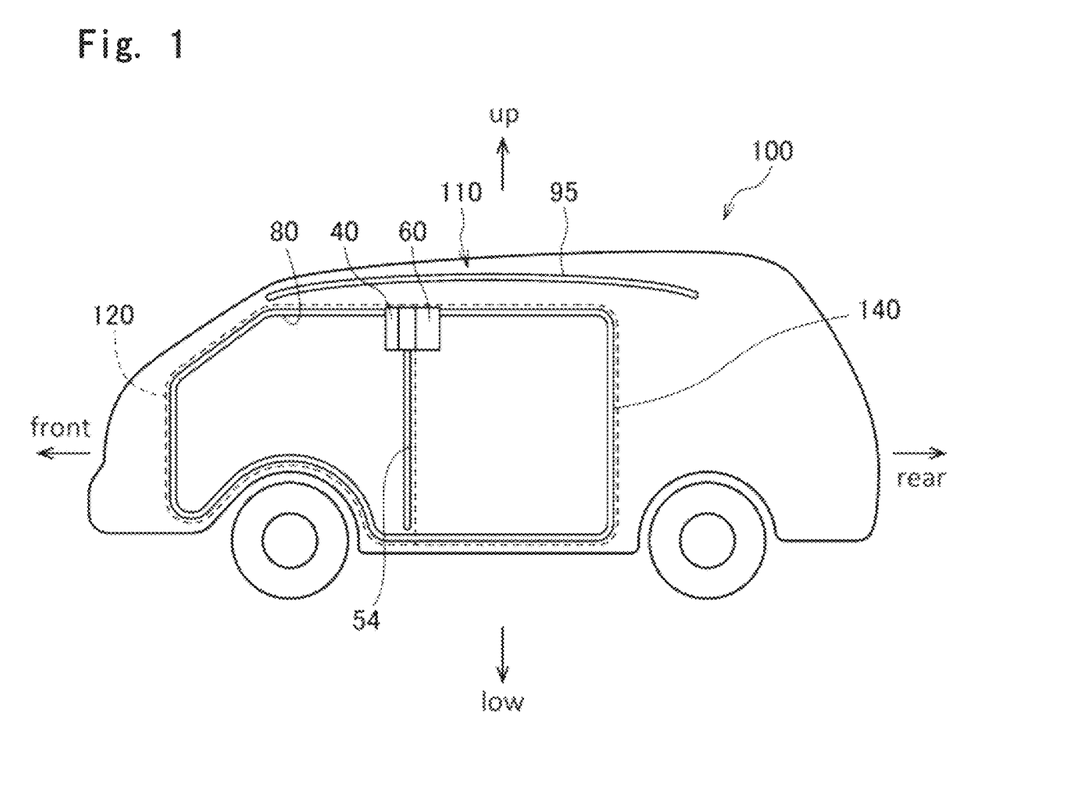
FIG. 1 is a schematic side view of a left side part of a center pillarless automobile with a sealing structure according to an embodiment of the present invention for a door of an automobile.
Figure 8A:
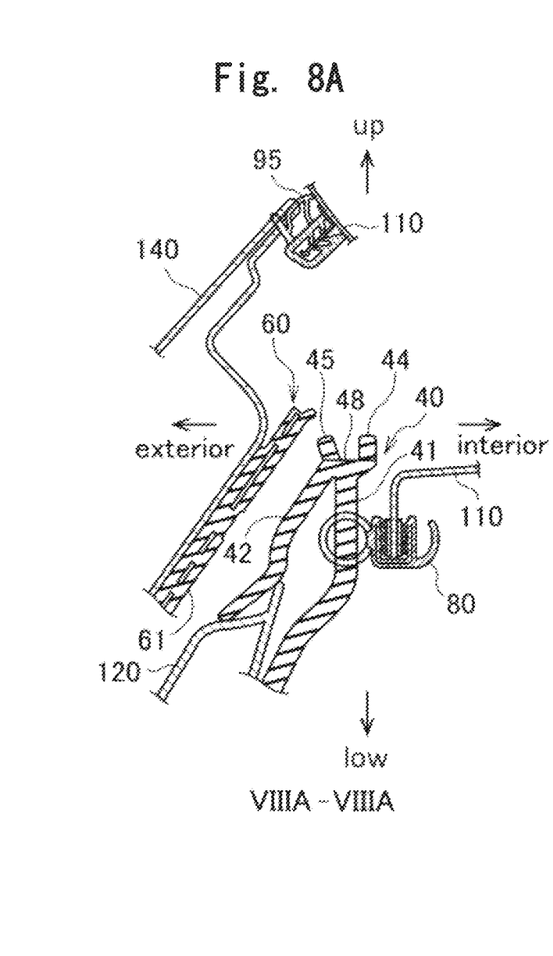
FIG. 8A is an enlarged cross-sectional view of the first and second molded parts taken along line VIIIA-VIIIA in FIG. 7 with the front and rear doors added.
Figure 8B:
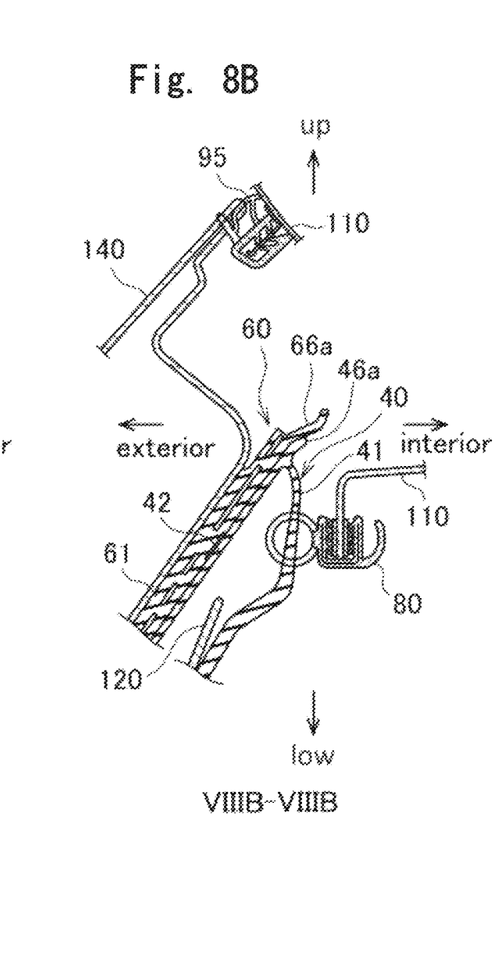
FIG. 8B is an enlarged cross-sectional view taken along line VIIIB-VIIIB.

When the doors 120, 140 are in closed positions, the doors 120, 140 make elastic contact with the main seal 80 as illustrated in FIG. 1 with the molded parts 40, 60 making elastic contact with each other on the upper part of the parting portion between the doors 120, 140 as illustrated in FIG. 8B, to seal a gap between the doors 120, 140.

Figure 8C:
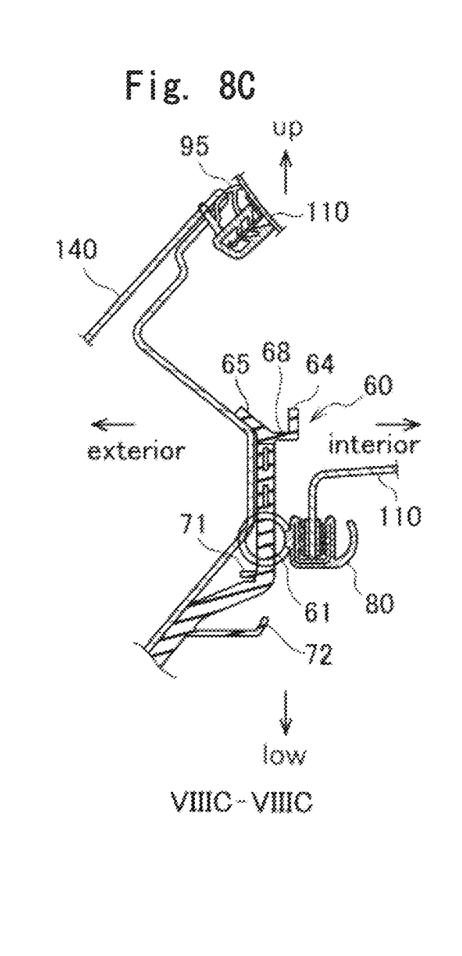
FIG. 8C is an enlarged cross-sectional view taken along line VIIIC-VIIIC.
Figure 9:
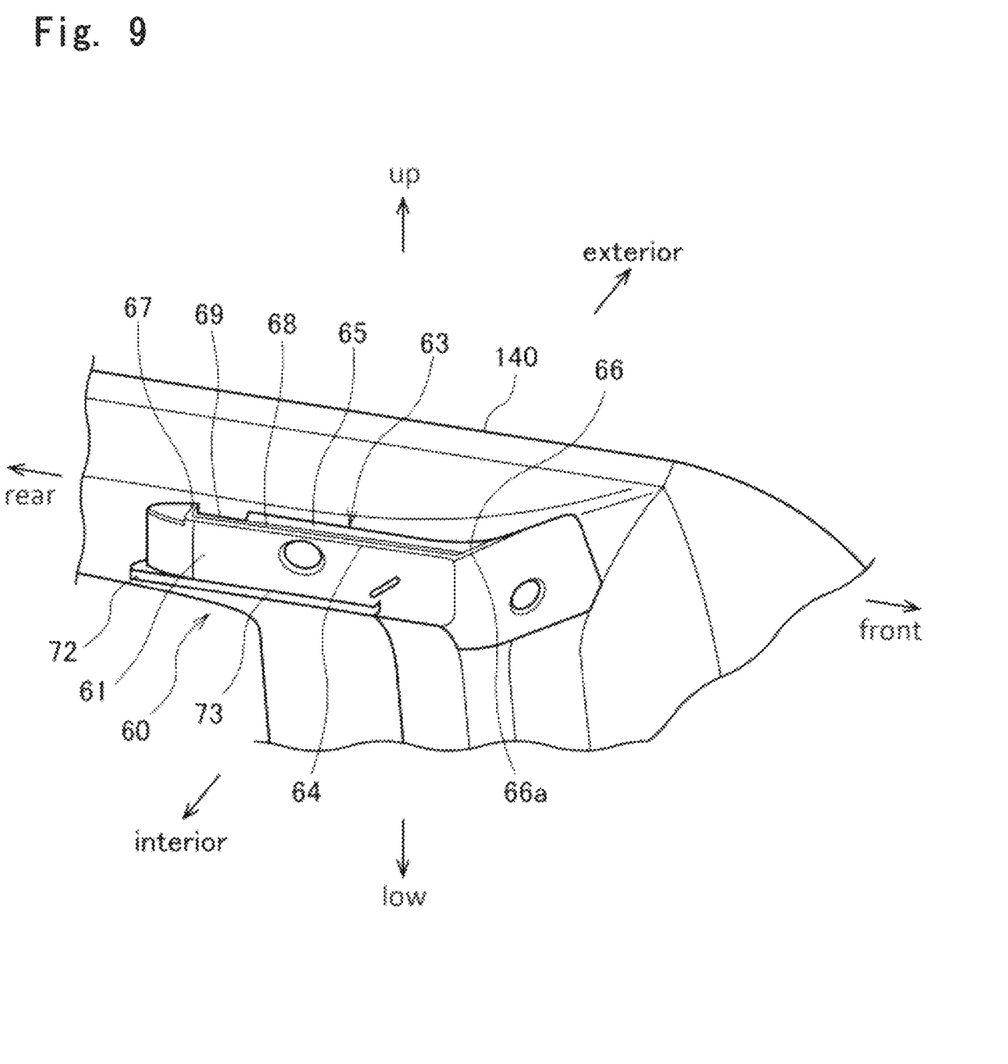
FIG. 9 is an enlarged perspective view of the second molded part illustrated in FIG. 2 coupling to the rear door.

The molded parts 40, 60 also make elastic contact with the main seal 80 as illustrated in FIGS. 8A, 8C, to seal a gap between the doors 120, 140 and the door opening edge 110.

Figure 3:
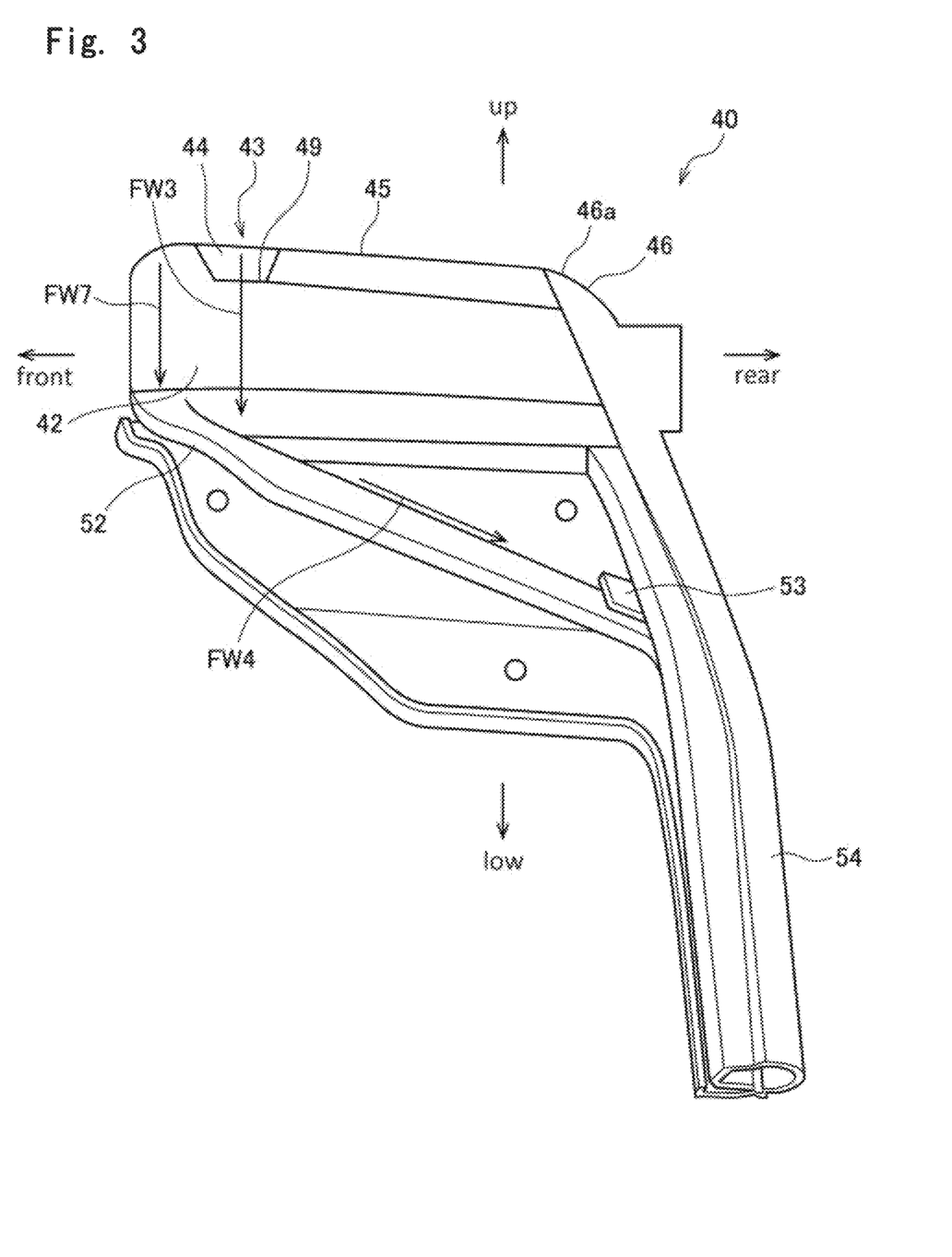
FIG. 3 is an enlarged perspective view of a first molded part illustrated in FIG. 2 from the exterior of the automobile.

As illustrated in FIGS. 1, 3, the first molded part 40 is provided on a rear side part of the front door 120 and extends in an upper and lower direction. The first molded part 40 is formed by die-molding on an upper end of a hollow seal part 54, which makes elastic contact with a front side part of the rear door 140 when the doors 120, 140 are in the closed positions.

As illustrated in FIGS. 1, 8C, an upper parting seal 95 is provided above the main seal 80. The upper parting seal 95 makes elastic contact with the doors 120, 140 when the doors 120, 140 are in the closed positions.

As illustrated in FIGS. 2 to 4, 7, the first molded part 40 includes a first concave-shaped part 43 on an upper part. The first concave-shaped part 43 has an upper side opening and is surrounded by a first inner-cabin wall 44, a first outer-cabin wall 45, a first rear wall 46, and a first front wall 47, which extend vertically in an upward direction. A first bottom wall 48 of the first concave-shaped part 43 is slightly inclined downward toward a front part of the automobile body from a rear part. A first cut 49 is provided on part of the first outer-cabin wall 45 closer to the first front wall 47. The first cut 49 is used to guide water inside the first concave-shaped part 43, from the position of elastic contact between the molded parts 40, 60 for example, toward the exterior of the automobile in the order of FW1, FW2, and FW3.

As illustrated in FIG. 3, a first bead 52 is provided on a first outer-cabin side surface 42 below the first cut 49. The first bead 52 is inclined downward toward the rear part of the automobile body. The first bead 52 receives water FW3, which drops toward the exterior of the automobile from the first cut 49.

The first bead 52 has a lower drainage hole 53 provided at a lower end. The lower drainage hole 53 is used to guide water FW4, which flows along the first bead 52, into the hollow seal part 54.

Figure 2:
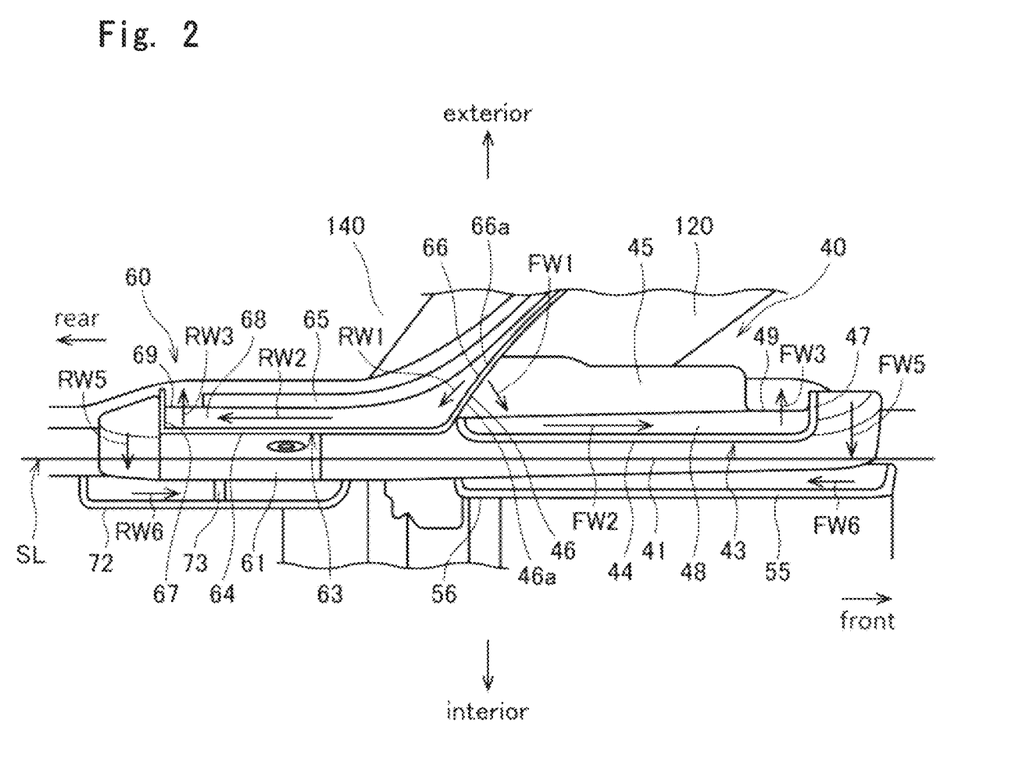
FIG. 2 is an enlarged perspective view of the principal components of the sealing structure according to the embodiment of the present invention.
Figure 4:
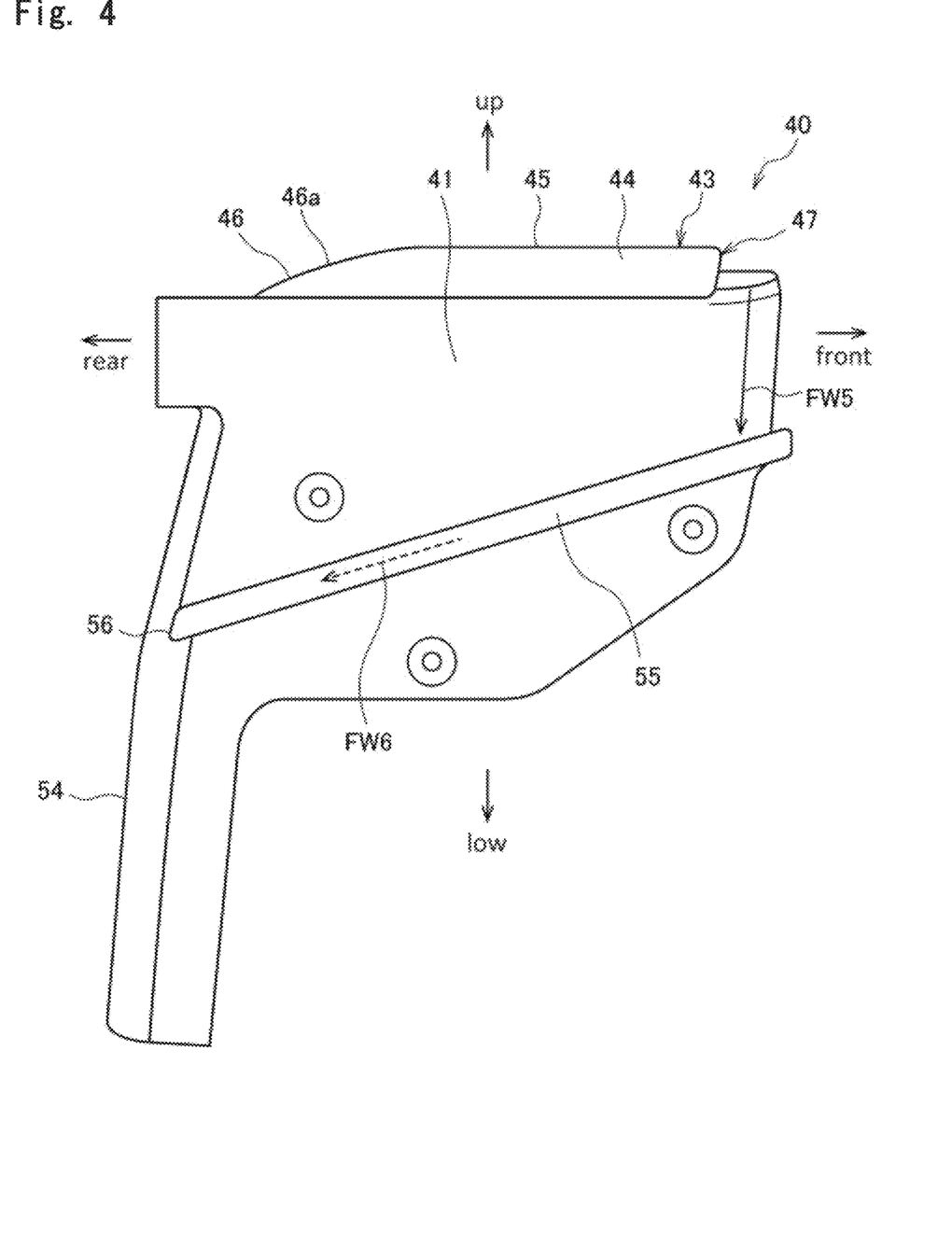
FIG. 4 is an enlarged perspective view of the first molded part illustrated in FIG. 2 from an interior of the automobile.
Figure 7:
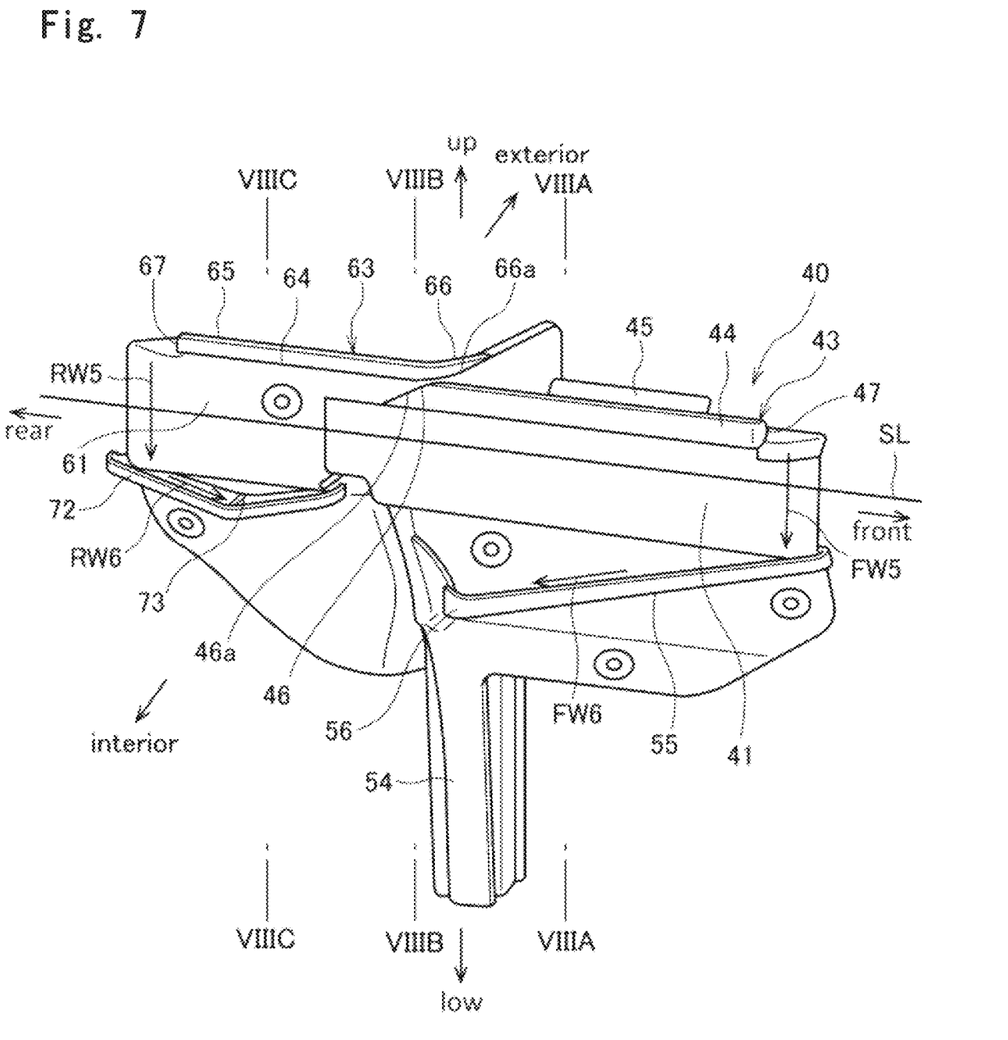
FIG. 7 is an enlarged perspective view of the first and second molded parts illustrated in FIG. 2 in elastic contact with each other with front and rear doors omitted.

As illustrated in FIGS. 2, 4, 7, a first gutter 55 is provided on a lower part of a first inner-cabin side surface 41 of the first molded part 40. The first gutter 55 is inclined downward toward the rear part of the automobile body. The first gutter 55 has a first drainage hole 56 provided at a lower end.

As illustrated in FIGS. 2, 5 to 7, the second molded part 60 includes a second concave-shaped part 63 on an upper part. The second concave-shaped part 63 has an upper side opening and is surrounded by a second inner-cabin wall 64, a second outer-cabin wall 65, a second front wall 66, and a second rear wall 67, which extend vertically in the upward direction. A second bottom wall 68 of the second concave-shaped part 63 is slightly inclined downward toward the rear part of the automobile body from the front part. A second cut 69 is provided on part of the second outer-cabin wall 65 closer to the second rear wall 67. The second cut 69 is used to guide water inside the second concave-shaped part 63, from the position of elastic contact between the molded parts 40, 60 for example, toward the exterior of the automobile in the order of RW1, RW2, and RW3.

Figure 5:
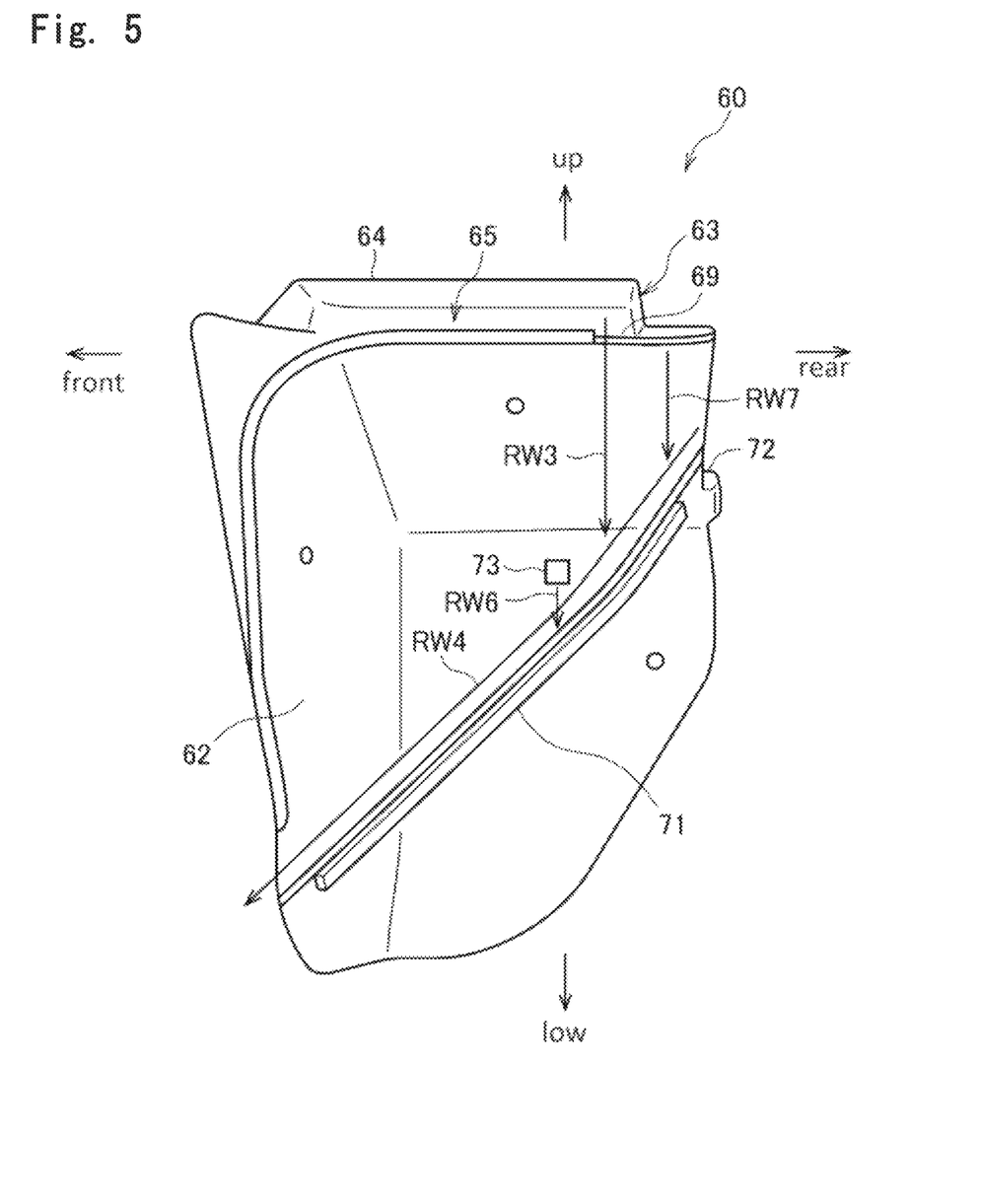
FIG. 5 is an enlarged perspective view of a second molded part illustrated in FIG. 2 from the exterior of the automobile.

As illustrated in FIG. 5, a second bead 71 is provided on a second outer-cabin side surface 62 of the second molded part 60 below the second cut 69. The second bead 71 is inclined downward toward the front part of the automobile body. The second bead 71 receives water RW3, which drops toward the exterior of the automobile from the second cut 69. The second bead 71 is used to guide water RW4, which flows along the second bead 71, forward toward the exterior of the automobile.

Figure 6:
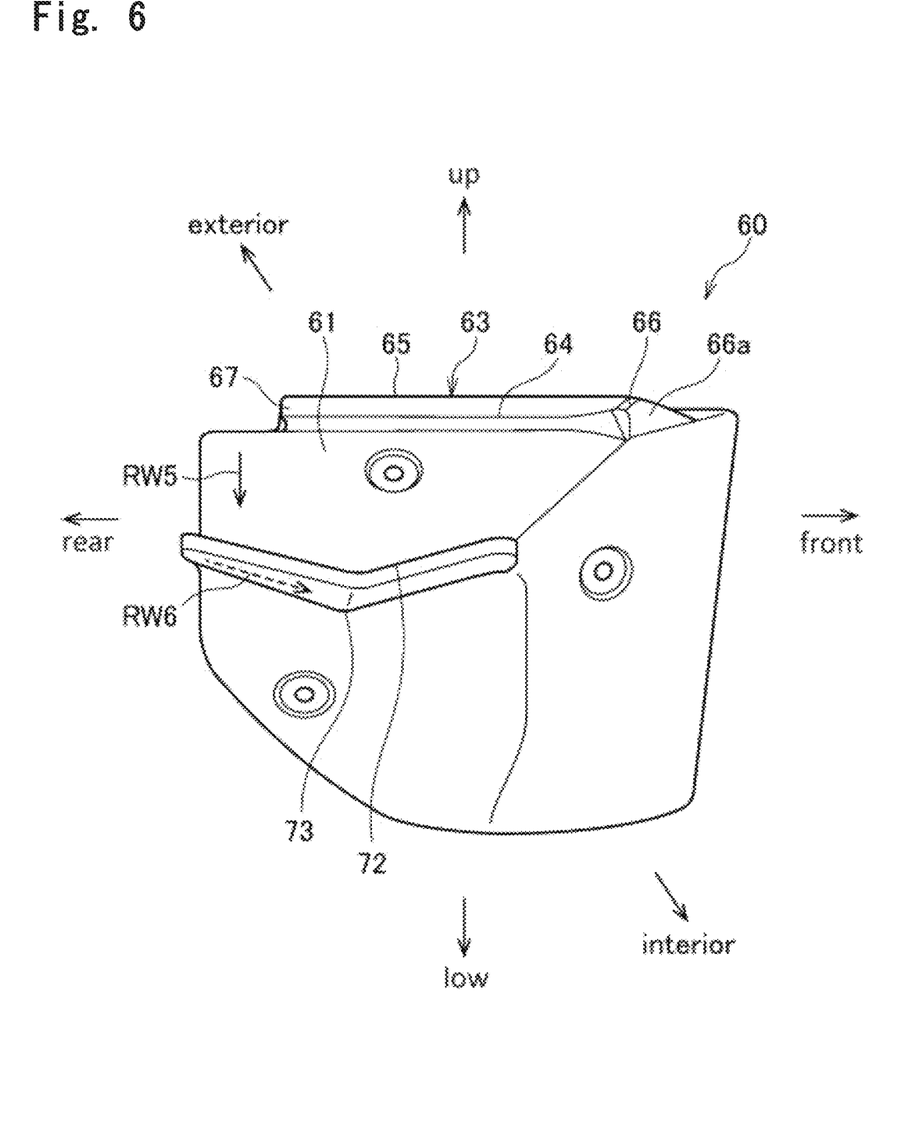
FIG. 6 is an enlarged perspective view of the second molded part illustrated in FIG. 2 from the interior of the automobile diagonally above.

As illustrated in FIGS. 2, 6, 7, a second gutter 72 is provided on a lower part of a second inner-cabin side surface 61 of the second molded part 60. The second gutter 72 is inclined downward toward the center of the second gutter 72, and has a second drainage hole 73 provided at a lower end.

As illustrated in FIGS. 4, 7, a rear surface 46a of the first rear wall 46 has an upper part inclined to be closer to the front part of the automobile body than a lower part. Also, as illustrated in FIG. 2, the rear surface 46a has an outer-cabin side part inclined to be closer to the front part of the automobile body than an inner-cabin side part.

As illustrated in FIGS. 6, 7, a front surface 66a of the second front wall 66 has an upper part inclined to be closer to the front part of the automobile body than a lower part. Also, as illustrated in FIG. 2, the front surface 66a has an outer-cabin side part inclined to be closer to the front part of the automobile body than an inner-cabin side part.

When the doors 120, 140 are in the closed positions, the molded parts 40, 60 make elastic contact with each other with the rear surface 46a and the front surface 66a, which are inclined, making elastic contact with each other as illustrated in FIGS. 2, 7, 8B.

In this embodiment, a hinged front door 120 is closed first, and a slidable rear door 140 is closed next. In other words, the front surface 66a approaches the rear surface 46a on the front door 120, which is closed first, from an outer-cabin side part, to make elastic contact as illustrated in FIG. 8B.

As illustrated in FIG. 8B, the front surface 66a makes elastic contact with the rear surface 46a below the upper parting seal 95 and above the main seal 80. The rear surface 46a has an upper edge lower than an upper edge of the front surface 66a.

The main seal 80 makes elastic contact with the first inner-cabin side surface 41 on a position illustrated in FIG. 8B, where the front surface 66a makes elastic contact with the rear surface 46a, as well as on a position illustrated in FIG. 8A, which is closer to the front part of the automobile body than FIG. 8B. The main seal 80 makes elastic contact with part of the second inner-cabin side surface 61 higher than the second gutter 72 on a position illustrated in FIG. 8C, which is closer to the rear part of the automobile body than FIG. 8B.

A seal line SL in FIGS. 2 and 7 illustrate the position of elastic contact of the first and second inner-cabin side surfaces 41, 61 with the main seal 80. The first inner-cabin side surface 41 is gradually reduced in thickness in the right and left direction of the automobile body toward a front part of the seal line SL and has no thickness and is disappeared on the front end such that the front door 120, not the first inner-cabin side surface 41, makes elastic contact with the main seal 80. The first concave-shaped part 43, which is provided just above the seal line SL, has the front end closer to the rear part of the automobile body than the front end of the first inner-cabin side surface 41. The first inner-cabin side surface 41 is exempt from limitations in the thickness in the right and left direction of the automobile body far below the seal line SL. The first gutter 55 has the front end closer to the front part of the automobile body than the front end of the first concave-shaped part 43. With this configuration, water FW5 leaking from part of the first molded part 40 closer to the front part of the automobile body than the first concave-shaped part 43 is stopped on the seal line SL, and part of water FW5 that passes the seal line SL without being stopped is received by the first gutter 55. Water FW6, which flows along the first gutter 55, is guided into the hollow seal part 54 through the first drainage hole 56.

As illustrated in FIGS. 2, 3, the first bead 52 is provided on the outer-cabin side of the first molded part 40, and has the front end closer to the front part of the automobile body than the front end of the first cut 49 in the same manner as the inner-cabin side. With this configuration, water FW7 leaking from part of the first molded part 40 closer to the front part of the automobile body than the first cut 49 is received by the first bead 52, and is guided into the hollow seal part 54 through the lower drainage hole 53.

As illustrated in FIGS. 2, 7, the second inner-cabin side surface 61 is gradually reduced in thickness in the right and left direction of the automobile body toward a rear part of the seal line SL and has no thickness and is disappeared on the rear end such that the rear door 140, not the second inner-cabin side surface 61, makes elastic contact with the main seal 80. The second concave-shaped part 63, which is provided just above the seal line SL, has the rear end closer to the front part of the automobile body than the rear end of the second inner-cabin side surface 61. The second inner-cabin side surface 61 is exempt from limitations in the thickness in the right and left direction of the automobile body far below the seal line SL. The second gutter 72 has the rear end closer to the rear part of the automobile body than the rear end of the second concave-shaped part 63. With this configuration, water RW5 leaking from part of the second molded part 60 closer to the rear part of the automobile body than the second concave-shaped part 63 is stopped on the seal line SL, and part of water RW5 that passes the seal line SL without being stopped is received by the second gutter 72. Water RW6, which flows along the second gutter 72, is drained toward the exterior of the automobile through the second drainage hole 73. More specifically, as illustrated in FIG. 5, the second drainage hole 73 pierces the second molded part 60, and has the second bead 71 provided on the lower side of second drainage hole 73. Water RW6, which flows along the second gutter 72, flows down from the second drainage hole 73, and is received by the second bead 71. As illustrated in FIGS. 2, 5, the second bead 71 is provided on the outer-cabin side of the second molded part 60, and has the rear end closer to the rear part of the automobile body than the rear end of the second cut 69 in the same manner as the inner-cabin side. With this configuration, water RW7 leaking from part of the second molded part 60 closer to the rear part of the automobile body than the second cut 69 is received by the second bead 71, and is drained toward the exterior of the automobile.

As discussed above, the first molded part 40, which includes the first concave-shaped part 43 on the upper part, is provided on the upper part of the rear end of the front door 120 of the automobile 100. The second molded part 60, which includes the second concave-shaped part 63 on the upper part, is provided on the upper part of the front end of the rear door 140. The front surface 66a makes elastic contact with the rear surface 46a when the doors 120, 140 are in the closed positions. The rear surface 46a has the upper part inclined to be closer to the front part of the automobile body than the lower part as well as the outer-cabin side part inclined to be closer to the front part of the automobile body than the inner-cabin side part. The front surface 66a has the upper part inclined to be closer to the front part of the automobile body than the lower part as well as the outer-cabin side part inclined to be closer to the front part of the automobile body than the inner-cabin side part. This configuration improves sealing performance between two adjacent die-molded parts, that is between the molded parts 40, 60.

Straightly pressing the rear surface 46a and the front surface 66a against a front and rear direction of the automobile body as disclosed in Japanese Unexamined Patent Application Publication No. 59-14519 allows water to get in the automobile body from a space between the rear surface 46a and the front surface 66a under a deviation in fitting in the front and rear direction that separates the front surface 66a from the rear surface 46a. In other words, sealing surfaces that are parallel to the right and left direction of the automobile body yield the space when the vertical planes make elastic contact with each other. The rear surface 46a and the front surface 66a of this embodiment are inclined in the upper and lower direction and in the right and left direction of the automobile body and make elastic contact with each other. This configuration hardly yields the space between the rear surface 46*a* and the front surface 66*a* under the deviation in the front and rear direction or in the right and left direction of the automobile body that separates the front surface 66*a* from the rear surface 46*a*. In addition, the first concave-shaped part 43, which comes on a lower side position than the second concave-shaped part 63, receives water if the space is yielded, to keep sealing performance unspoiled.

Also, this configuration hardly deforms the concave-shaped parts 43, 63 under another deviation in the front and rear direction or in the right and left direction of the automobile body that brings the rear surface 46*a* and the front surface 66*a* close to each other, to keep the sealing performance unspoiled.

In addition, the front surface 66*a* makes elastic contact with the rear surface 46*a* above the main seal 80, to prevent drop of water toward the main seal 80. This configuration eliminates the need for increasing sealing function by increasing surface pressure of the main seal 80 or inserting a pad in a hollow part of the main seal 80.

In addition, the structure further includes the upper parting seal 95 provided on the upper side part of the door opening edge 110 above the main seal 80. The upper parting seal 95 makes elastic contact with the doors 120, 140 when the doors 120, 140 are in the closed positions with the front surface 66*a* making elastic contact with the rear surface 46*a* below the upper parting seal 95. This configuration enables the concave-shaped parts 43, 63 to receive water that drops from the upper parting seal 95, to improve the sealing performance.

In addition, the structure further includes the first cut 49, provided on the first outer-cabin wall 45. The first cut 49 is used to guide water inside the first concave-shaped part 43 toward the exterior of the automobile. The structure further includes the second cut 69, provided on the second outer-cabin wall 65. The second cut 69 is used to guide water inside the second concave-shaped part 63 toward the exterior of the automobile. This configuration prevents overflow of water received by the concave-shaped parts 43, 63.

In addition, the structure further includes the first bead 52, provided on the first outer-cabin side surface 42 below the first cut 49. The first bead 52 is inclined downward toward the rear part of the automobile body. The first bead 52 is used to guide water that drops from the first cut 49 into the hollow seal part 54 and toward the exterior of the automobile. This configuration prevents defects in drainage such as splash of water.

In addition, the structure further includes the second bead 71, provided on the second outer-cabin side surface 62 below the second cut 69. The second bead 69 is inclined downward toward the front part of the automobile body. The second bead 71 is used to guide water that drops from the second cut 69 toward the exterior of the automobile. This configuration prevents defects in the drainage such as splash of water.

In this embodiment, the sealing structure is applied to the upper part of the parting portion between the hinged front door 120 and the slidable rear door 140. In some embodiments, the sealing structure is applied to hinged double doors where the doors 120, 140 are hinged, or slidable double doors where the doors 120, 140 are slidable in the front and rear direction.

In this embodiment, the upper parting seal 95 couples to a flange of the door opening edge 110. In some embodiments, the upper parting seal 95 is attached to the flange with double-sided tape or clips. In some embodiments, the outer-cabin walls 45, 65 are attached to the doors 120, 140 with double-sided tape or clips depending on necessity.

It is only required that the molded parts 40, 60 are made of rubber-like elastic body with an appropriate rigidity. Examples of the rubber-like elastic body include rubber material such as EPDM and thermoplastic resin such as TPO. Also, the rubber-like elastic body may be foamed rubber-like elastic body or non-foamed rubber-like elastic body.

We claim:

1. A sealing structure for a door of an automobile, the structure comprising:
    a main seal configured to be provided along a door opening edge of an automobile body of an automobile that does not have a center pillar;
    a first molded part configured to be provided on an upper part of a rear end of a front door of the automobile, wherein the first molded part includes a first concave-shaped part on an upper part of the first molded part, the first concave-shaped part includes an upper side opening and a first rear wall, the first rear wall has a rear surface having an upper part inclined to be closer to a front part and an interior of the automobile body than a lower part, and the first rear wall has outer-cabin side part inclined to be closer to the front part of the automobile body than an inner-cabin side part;
    a second molded part configured to be provided on an upper part of a front end of a rear door of the automobile, wherein the second molded part includes a second concave-shaped part on an upper part of the second molded part, the second concave-shaped part includes an upper side opening and a second front wall, the second front wall has a front surface having an upper part inclined to be closer to the front part and the interior of the automobile body than a lower part, and the second front wall has an outer-cabin side part inclined to be closer to the front part of the automobile body than an inner-cabin side part,
    wherein the first molded part and the second molded part are configured to make elastic contact with the main seal, to seal a parting portion between the front door and the rear door of the automobile, and
    wherein the front surface of the second front wall of the second concave-shaped part is configured to makes elastic contact with the rear surface of the first rear wall of the first concave-shaped part when the front door and the rear door of the automobile are in closed positions.

2. The sealing structure as claimed in claim 1, wherein the front surface of the second front wall of the second concave-shaped part is configured to make elastic contact with the rear surface of the first rear wall of the first concave-shaped part above the main seal, and
    wherein the rear surface has an upper edge that is lower than an upper edge of the front surface when the front surface and the rear surface make elastic contact.

3. The sealing structure as claimed in claim 2, further comprising an upper parting seal configured to be provided on an upper side part of the door opening edge of the automobile body above the main seal,
    wherein the upper parting seal being is configured to make elastic contact with the front door and the rear door when the doors are in the closed positions with the front surface of the second front wall of the second concave-shaped part making elastic contact with the rear surface of the first rear wall of the first concave-shaped part below the upper parting seal.

4. The sealing structure as claimed in claim 2, wherein the first concave-shaped part has a first outer-cabin wall, and the second concave-shaped part has a second outer-cabin wall, and
   wherein the sealing structure further comprises:
   a first cut provided on the first outer-cabin wall of the first concave-shaped part, the first cut being configured to guide water inside the first concave-shaped part toward the exterior of the automobile; and
   a second cut provided on the second outer-cabin wall of the second concave-shaped part, the second cut being configured to guide water inside the second concave-shaped part toward the exterior of the automobile.

5. The sealing structure as claimed in claim 4, further comprising a first bead provided on a first outer-cabin side surface of the first molded part below the first cut, the first bead being inclined downward toward a rear part of the automobile body.

6. The sealing structure as claimed in claim 4, further comprising a second bead provided on a second outer-cabin side surface of the second molded part below the second cut, the second bead being inclined downward toward the front part of the automobile body.

7. The sealing structure as claimed in claim 1, further comprising an upper parting seal configured to be provided on an upper side part of the door opening edge of the automobile body above the main seal,
   wherein the upper parting seal is configured to make elastic contact with the front door and the rear door when the doors are in the closed positions with the front surface of the second front wall of the second concave-shaped part making elastic contact with the rear surface of the first rear wall of the first concave-shaped part below the upper parting seal.

8. The sealing structure as claimed in claim 1, wherein the first concave-shaped part has a first outer-cabin wall, and the second concave-shaped part has a second outer-cabin wall, and
   wherein the sealing structure further comprises:
   a first cut provided on the first outer-cabin wall of the first concave-shaped part, the first cut being configured to guide water inside the first concave-shaped part toward the exterior of the automobile; and
   a second cut provided on the second outer-cabin wall of the second concave-shaped part, the second cut being configured to guide water inside the second concave-shaped part toward the exterior of the automobile.

9. The sealing structure as claimed in claim 8, further comprising a first bead provided on a first outer-cabin side surface of the first molded part below the first cut, the first bead being inclined downward toward a rear part of the automobile body.

10. The sealing structure as claimed in claim 8, further comprising a second bead provided on a second outer-cabin side surface of the second molded part below the second cut, the second bead being inclined downward toward the front part of the automobile body.

* * * * *